(12) United States Patent
Ito et al.

(10) Patent No.: US 7,593,053 B2
(45) Date of Patent: Sep. 22, 2009

(54) AUTOFOCUS DEVICE METHOD

(75) Inventors: Yujiro Ito, Kanagawa (JP); Hidekazu Suto, Tokyo (JP); Shinji Takemoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 484 days.

(21) Appl. No.: 11/400,960

(22) Filed: Apr. 10, 2006

(65) Prior Publication Data
US 2006/0232701 A1 Oct. 19, 2006

(30) Foreign Application Priority Data
Apr. 15, 2005 (JP) ............ P2005-119035

(51) Int. Cl.
H04N 5/232 (2006.01)
H04N 5/228 (2006.01)
G03B 3/10 (2006.01)
G03B 3/00 (2006.01)

(52) U.S. Cl. ............... 348/348; 348/345; 348/208.12; 348/208.16; 396/89; 396/121; 396/125

(58) Field of Classification Search ............ 348/208.12, 348/345–356; 396/121–125, 89
See application file for complete search history.

(56) References Cited

U.S. PATENT DOCUMENTS

| 5,798,793 | A | * | 8/1998 | Tanaka | 348/347 |
| 6,101,336 | A | * | 8/2000 | Nonaka | 396/121 |
| 6,278,489 | B1 | * | 8/2001 | Hirasawa | 348/348 |
| 2004/0100573 | A1 | * | 5/2004 | Nonaka | 348/345 |
| 2004/0125229 | A1 | * | 7/2004 | Aoyama et al. | 348/345 |
| 2005/0185083 | A1 | * | 8/2005 | Okawara | 348/345 |
| 2006/0165403 | A1 | * | 7/2006 | Ito | 396/123 |

FOREIGN PATENT DOCUMENTS

| JP | 5 336427 | 12/1993 |
| JP | 8-29665 | 2/1996 |
| JP | 10-213736 | 8/1998 |
| JP | 2003-107329 | 4/2003 |
| JP | 2004-117775 | 4/2004 |
| JP | 2005-84424 | 3/2005 |

* cited by examiner

Primary Examiner—Jason Chan
Assistant Examiner—Michael Osinski
(74) Attorney, Agent, or Firm—Frommer Lawrence & Haug LLP; William S. Frommer; Paul A. Levy

(57) ABSTRACT

Autofocus device has a lens-driving unit, a focal-point-position-detecting unit, and a distance measurement sensor that measures a distance to a subject. The device also has a control unit for controlling the lens-driving unit to drive the lens, thereby meeting the detected position of the focal point of the lens to an in-focus position. If a restart condition has not yet been satisfied after meeting the position of the focal point to the in-focus position to stop the focus operation, the control unit determines a switch of focusing on subjects based on the detected position of the focal point and a measured distance result by the distance measurement sensor and then restarts the focus operation based on a determination result thereof, thereby driving the lens to meet the position of the focal point to an in-focus position based on a measured distance result by the distance measurement sensor.

7 Claims, 10 Drawing Sheets

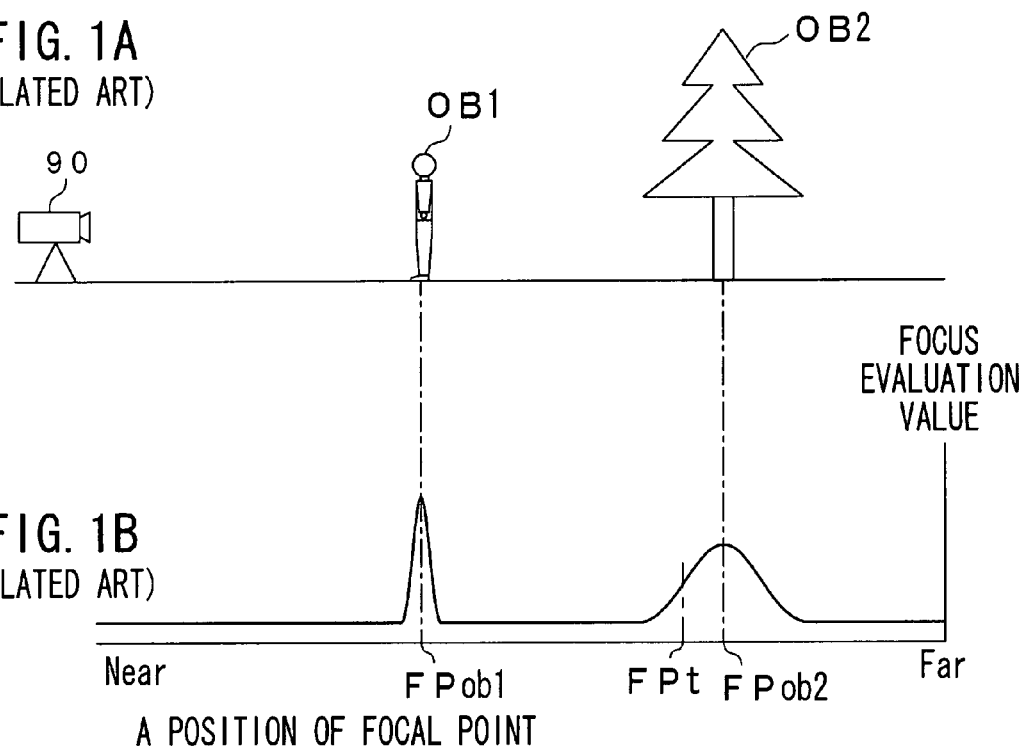
FIG. 1A (RELATED ART)
FIG. 1B (RELATED ART)
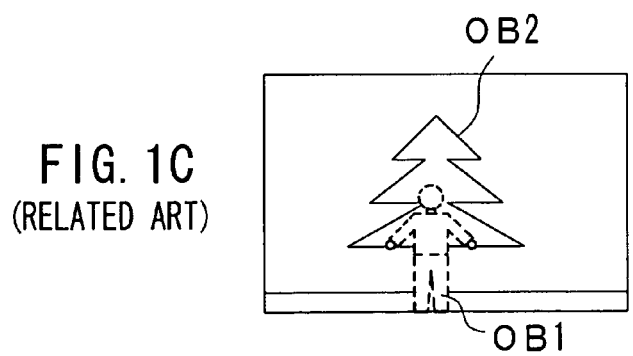
FIG. 1C (RELATED ART)

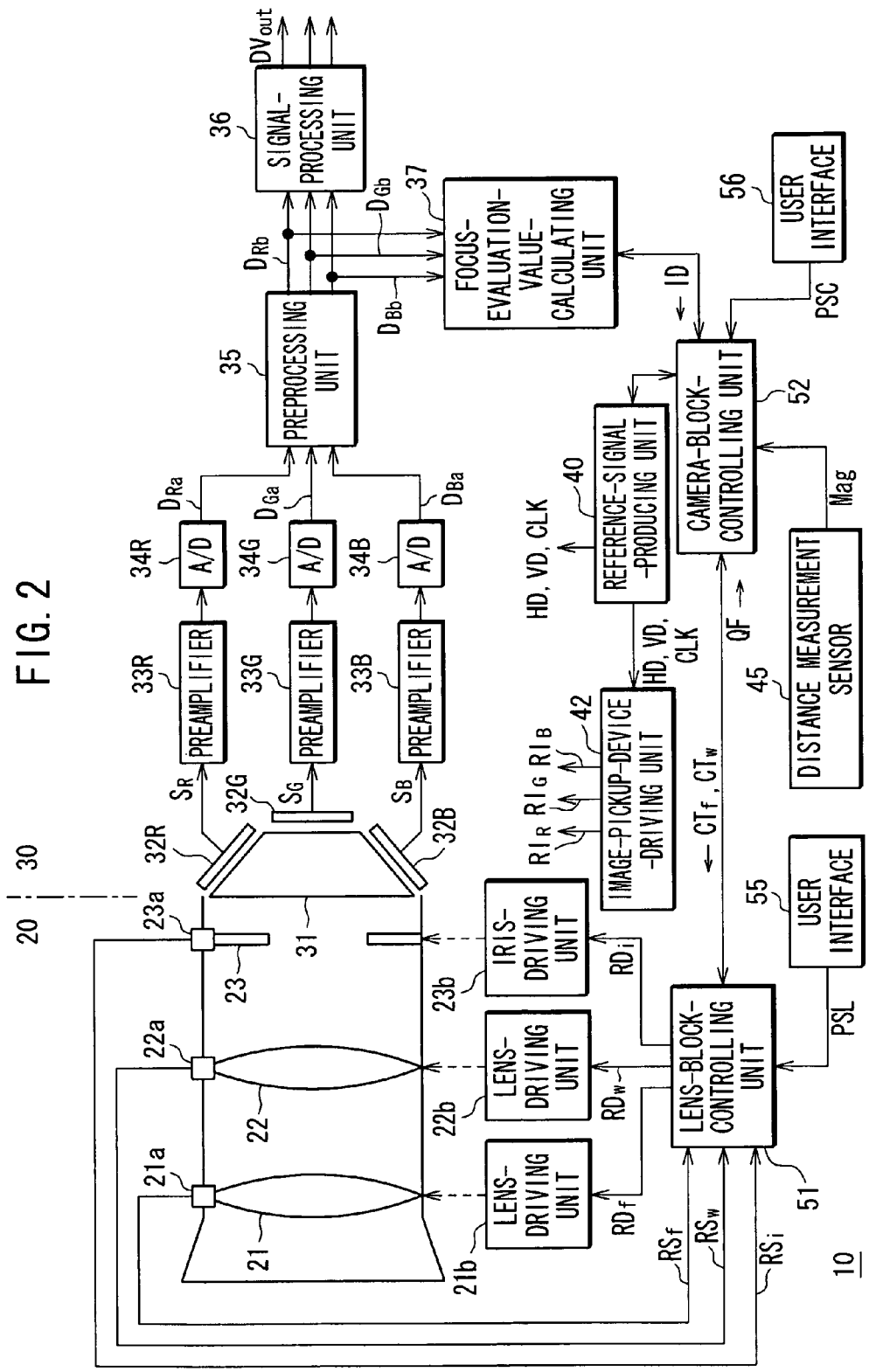

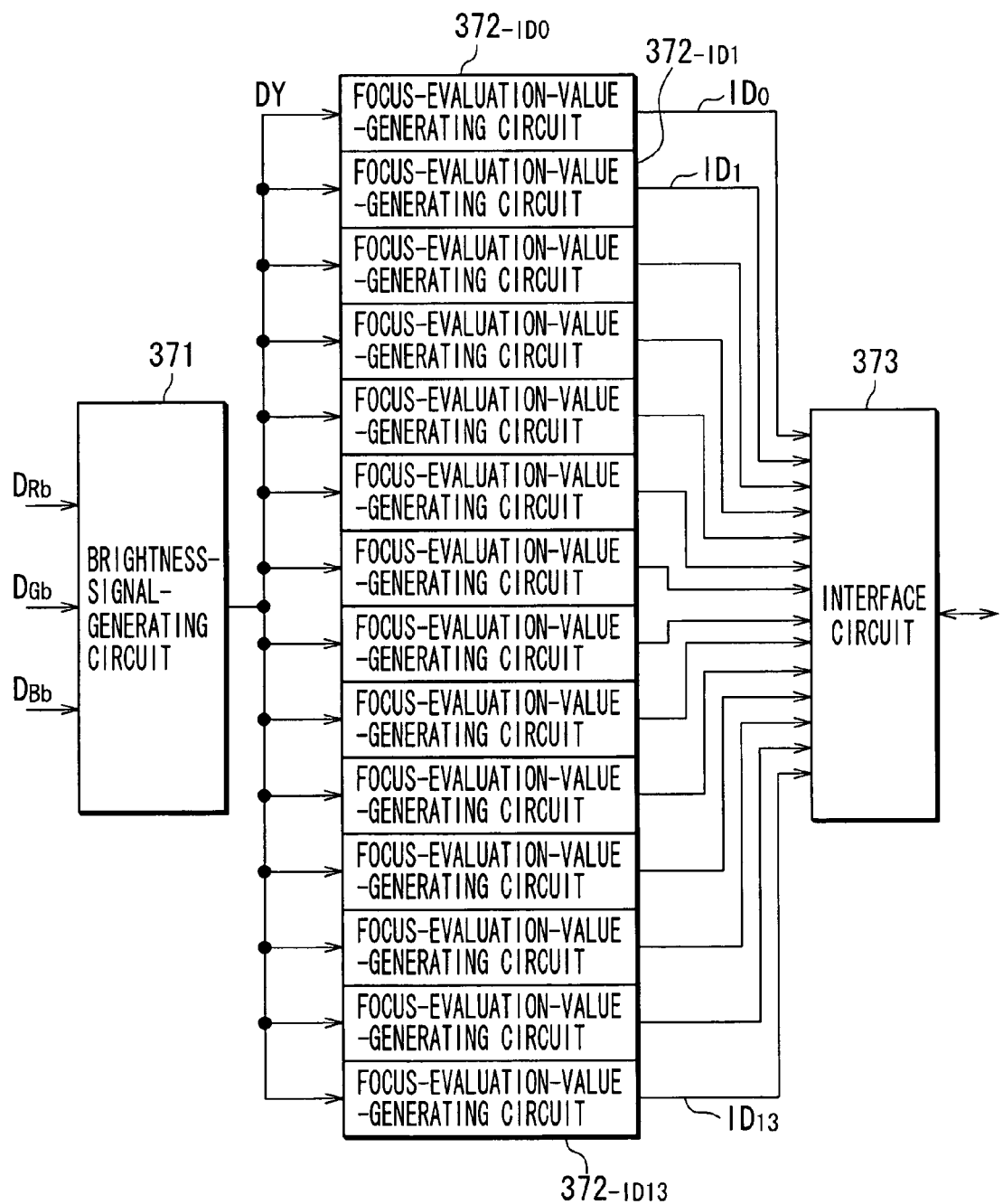

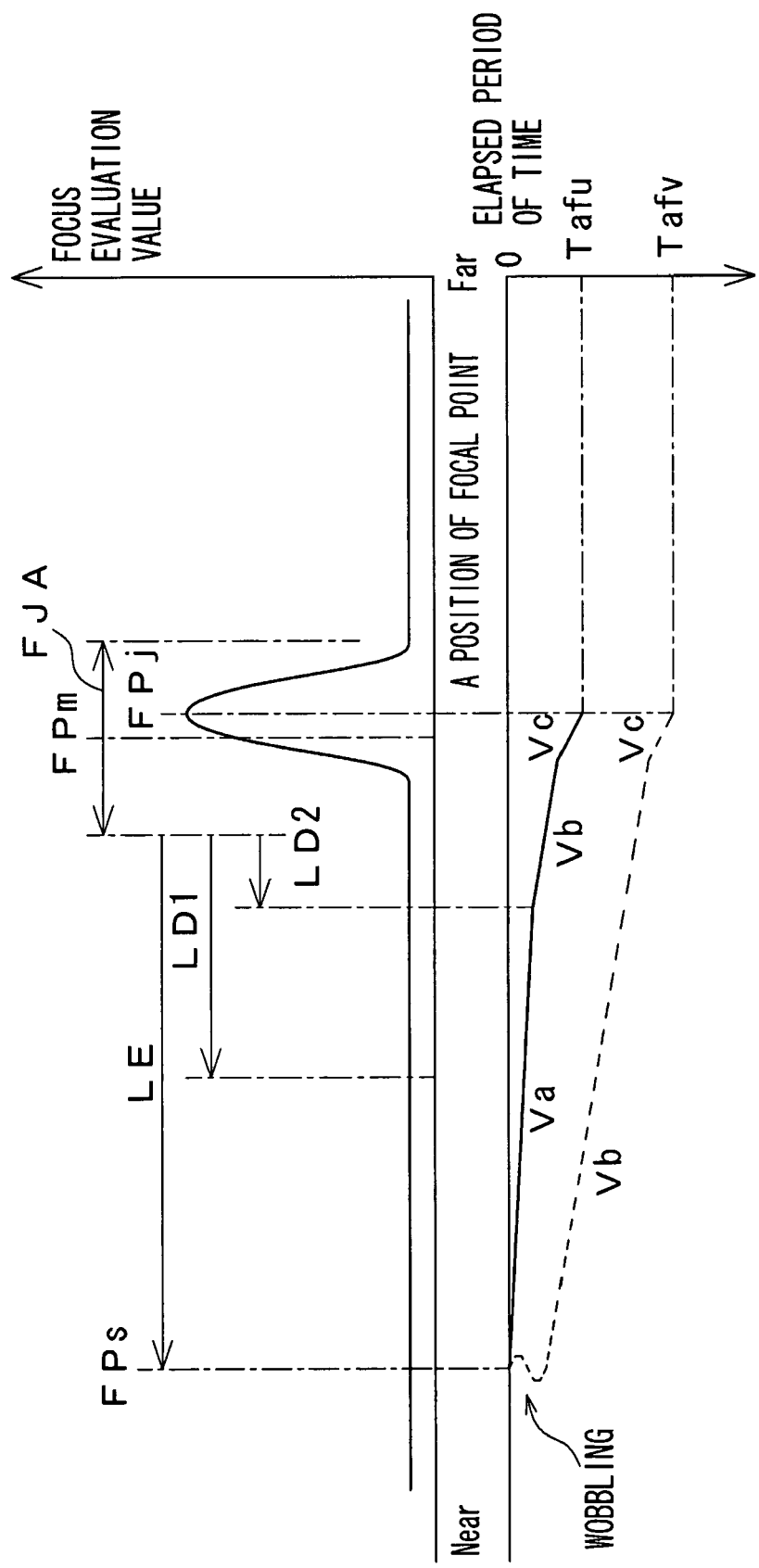

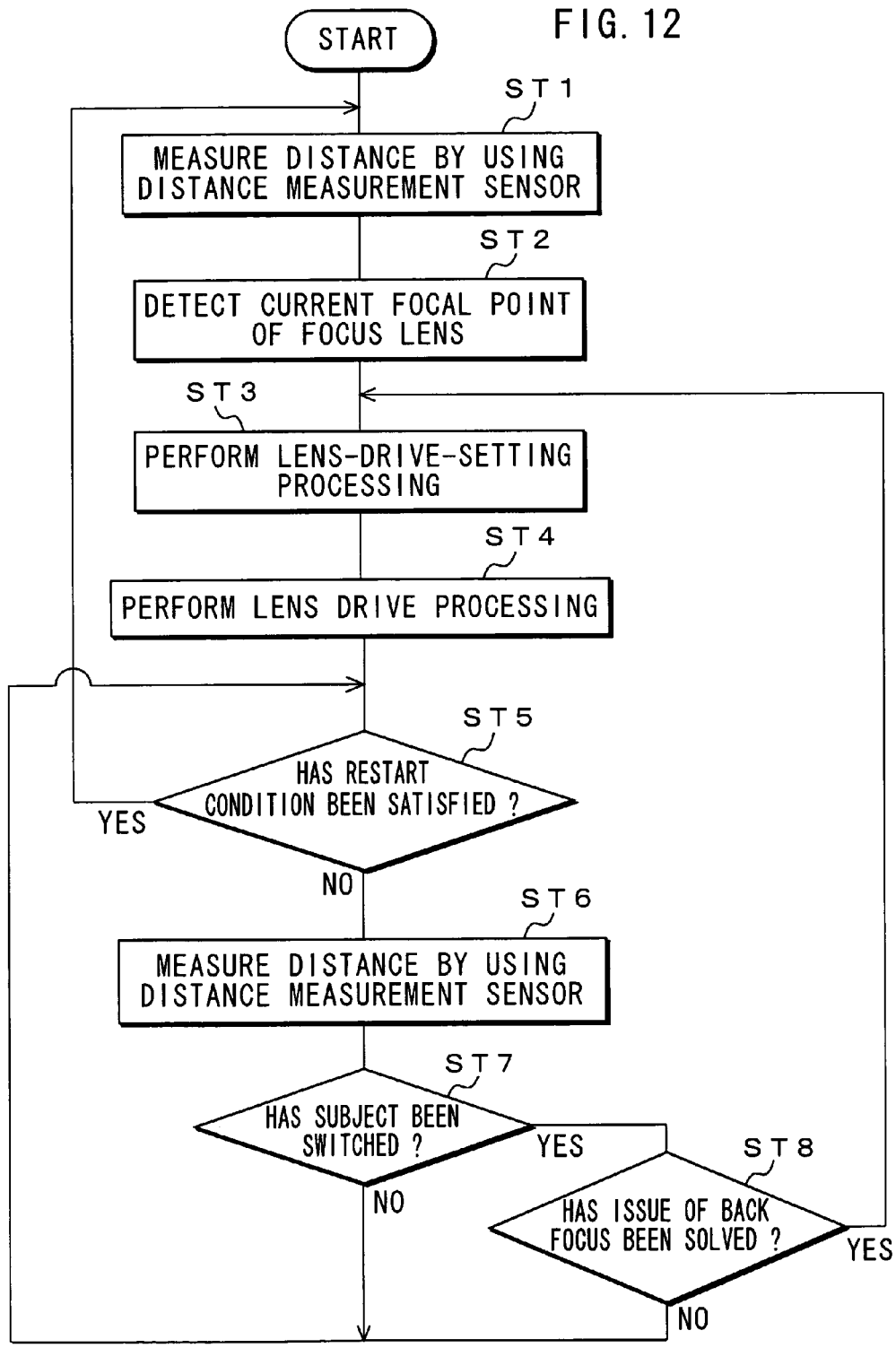

AUTOFOCUS DEVICE METHOD

CROSS REFERENCE TO RELATED APPLICATION

The present invention contains subject matter related to Japanese Patent Application No. JP2005-119035 filed in the Japanese Patent Office on Apr. 15, 2005, the entire contents of which being incorporated herein by reference.

BACKGROUND OF THE INVENTION

1. Field of the Invention

This invention relates to autofocus device and method and a program product therefor, which are used in an imaging apparatus.

2. Description of Related Art

The imaging apparatus such as a video camera and a digital still camera has been equipped with any autofocus mechanism that automatically focuses on a subject. The autofocus mechanism calculates focus evaluation values using frequency components of an image signal in a particular region that is provided in an imaging frame (finder's view) to and drives a focus lens so that the maximum focus evaluation value can be given (see Japanese Patent Application Publication No. H10-213736). Thus, if imaging after such the particular region is set on a center of the imaging frame and a composition of the imaging frame is fixed to put the subject on the center of the imaging frame, it is possible to focus on the subject automatically when a position of a focal point of the focus lens meets an in-focus position thereof.

SUMMARY OF THE INVENTION

If there are two subjects in the particular region provided in the imaging frame and autofocus operations are carried out to focus on any one of the subjects, it may be not easily possible to switch the autofocus operations to focus on the other subject in the particular region.

For example, as shown in FIG. 1A, if an imaging apparatus 90 images a subject person OB1 and a background tree OB2 simultaneously, the particular region includes the subject person OB1 and the background tree OB2. When the imaging apparatus 90 focuses on the tree OB2 at this situation, it then may be not easily possible to focus on the person OB1 automatically based on any "back focus" even when the autofocus mechanism tries to focus on the person OB1. It is to be noted that the back focus means that main subject focused on is out of focus but the background is in focus.

Namely, if an imaging apparatus 90 images the subject person OB1 and the background tree OB2 simultaneously as shown in FIG. 1A, focus evaluation values indicate their maximum values at positions of a focal point of the focus lens corresponding to a position Fpob1 of the person OB1 and a position FPob2 of the tree OB2, as shown in FIG. 1B. In the autofocus operation, autofocus adjustment is carried out by controlling a position of the focus lens so that the maximum focus evaluation value may be given. Therefore, when the focus lens is driven from a position FPt of the focal point of the focus lens toward the position Fpob1, it may be determined that the focal point of the focus lens passes through an in-focus position thereof because of decrease of the focus evaluation value, thereby resulting in reverse driving of the focus lens. Thus, this fails to drive the focus lens automatically from the position FPt of the focal point of the focus lens toward the position Fpob1.

If the lens wobbles at a start of the autofocus operation and it is once determined that the in-focus position is a position FPob2 of the focal point of the lens, for example, an autofocus control is performed to keep the position FPob2 as the in-focus position. This also fails to switch the in-focus position automatically from the position FPob2 to the position FPob1. As the result thereof, a situation where a blur image of the near person OB1 (with an in-focus image of far tree) occurs is kept, as shown in FIG. 1C, thereby lacking any solution to an issue of "back focus". If it is once determined 1D that the in-focus position is a position FPob1 of the focal point of the lens, namely, an in-focus image of the near person OB1 occur, it may be impossible to be released from such the situation.

It is desirable to present autofocus device and method and a program product therefor that can focus on a desired subject automatically from a situation where the autofocus device has already focused on another subject.

According to an embodiment of the present invention, there is provided autofocus device having a lens-driving unit that drives a lens, a focal-point-position-detecting unit that detects a position of a focal point of the lens. The device also has a distance measurement sensor that measures a distance to a subject, and a control unit that performs a focus operation to control the lens-driving unit to drive the lens, thereby meeting the position of the focal point of the lens detected by the focal-point-detecting unit to an in-focus position thereof.

If a restart condition of the focus operation has not yet been satisfied after meeting the position of the focal point of the lens to the in-focus position thereof to stop the focus operation, the control unit determines a switch of focusing on subjects based on the position of the focal point of the lens detected by the focal-point-detecting unit and a measured distance result by the distance measurement sensor.

The control unit then restarts the focus operation based on a result of the switching determination, thereby driving the lens to meet the position of the focal point of the lens to an in-focus position thereof based on a measured distance result by the distance measurement sensor.

According to an embodiment of the present invention, there is provided an autofocus method. The method includes a focal-point-position detecting step of detecting a position of a focal point of a lens, a distance-measuring step of measuring a distance to a subject, and a subject switch determination step of determining a switch of focusing on subjects based on the position of the focal point of the lens detected in the focal-point-detecting step and a measured distance result measured in the distance-measuring step if a restart condition of the focus operation has not yet been satisfied after meeting the position of the focal point of the lens to the in-focus position thereof to stop a focus operation that meets the position of the focal point of the lens to the in-focus position thereof once. The method also includes a focus-readjusting step of restarting the focus operation based on a determination result of the switch of focusing on subjects in the subject switch determination step to drive the position of the focal point of the lens to an in-focus position thereof based on a measured distance result by the distance measurement sensor.

According to further embodiment of the present invention, there is provided a computer program product that allows a computer to execute the above autofocus method.

In any embodiments of the invention, if a restart condition such as an alteration in any focus evaluation values using a frequency component of an image signal in a first particular region provided in an image frame and an alteration in any brightness integration values that calculate brightness component values of an image signal in a second particular region provided in the image frame has not yet been satisfied after meeting the position of the focal point of the lens to the in-focus position thereof to stop the focus operation, any determination of a switch of focusing on subjects can be carried out based on the position of the focal point of the lens detected by the focal-point-detecting unit and a measured distance result by the distance measurement sensor.

If a determination period of time when a difference between the in-focus position and the position of the focal point of the lens based on the measured distance result by the distance measurement sensor exceeds a predetermined distance for determination of the switching lasts longer than a reference period of time for the switch of focusing on subjects, it is determined that a subject to be in focus has been switched. The focus operation then restarts. The position of the focal point of the lens is met to an in-focus position thereof based on a new measured distance result by the distance measurement sensor.

Thus, according to any embodiments of the invention, if a restart condition of the focus operation has not yet been satisfied after meeting the position of the focal point of the lens to the in-focus position thereof to stop the focus operation once, any determination of a switch of focusing on subjects can be carried out based on the position of the focal point of the lens and a measured distance result by the distance measurement sensor. The focus operation then restarts based on a determination result of the switch of focusing on subjects to meet the position of the focal point of the lens to an in-focus position thereof based on a new measured distance result by the distance measurement sensor. Therefore, a focus operation is carrying out with the distance measurement sensor measuring a distance up to a desired subject when another subject is in focus. If so, when it is determined that the subject to be in focus has been switched, the position of the focal point can be met to an in-focus position based on a new measured distance result by the distance measurement sensor, thereby allowing the desired subject being in focus automatically.

The concluding portion of this specification particularly points out and directly claims the subject matter of the present invention. However those skills in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIGS. 1A through 1C are drawings for illustrating an autofocus operation according to a related art;

FIG. 2 is a block diagram for showing a configuration of an embodiment of a video camera according to the invention;

FIG. 3 is a block diagram for showing a configuration of a focus evaluation value-calculating unit;

FIG. 10 is a diagram for explaining autofocus operations using a measured distance result;

FIG. 12 is a flowchart for showing another autofocus operation.

DESCRIPTION OF THE PREFERRED EMBODIMENTS

Figure 4:
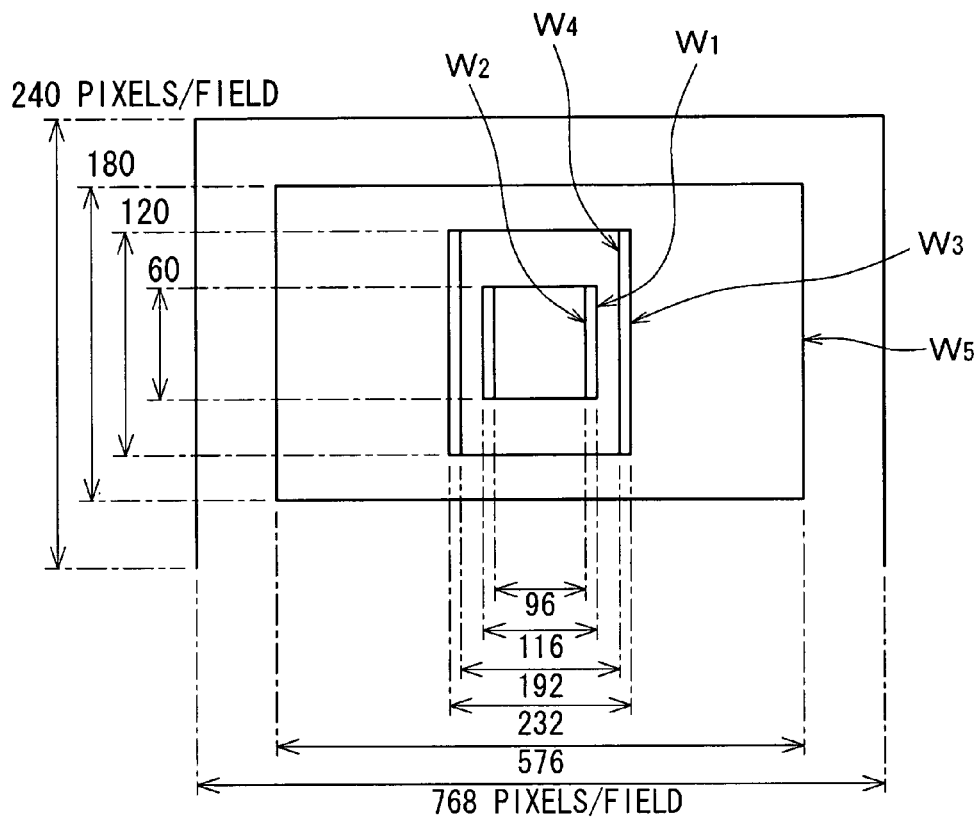
FIG. 4 is a diagram for showing sizes of evaluation windows.

The following will describe embodiments of the invention with reference to the accompanying drawings. FIG. 2 shows a whole configuration of an imaging apparatus such as a video camera 10 having an autofocus mechanism.

A lens block 20 of the video camera 10 is constituted of an imaging lens, a lens-position-detecting unit that detects a position of the imaging lens, a lens-driving unit that drives the imaging lens and the like. It is to be noted that in the lens block 20 shown in FIG. 2, as the imaging lens, a focus lens 21 for focusing an image of subject on an imaging surface of an imaging element and a wobbling lens 22 for utilizing determination of a driving direction of the focus lens 21 to meet a position of its focal point to an in-focus position are illustrated.

For the focus lens 21, are provided a lens-position-detecting unit 21a that detects a position of the focus lens 21, i.e. a focal-point-position-detecting unit that detects a position of a focal point of the focus lens 21, and a lens-driving unit 21b that drives the focus lens 21 to move the lens position along its optical axis.

Similarly, for the wobbling lens 21, are provided a lens-position-detecting unit 22a that detects a position of the wobbling lens 22 and a lens-driving unit 22b that drives the wobbling lens 22 to move the lens position along its optical axis, in order to perform any suitable wobbling.

The lens block 20 has an iris 23 to control an amount of incident light. For the iris 23, also are provided an iris-position-detecting unit 23a that detects an opening level of an aperture of the iris 23 and an iris-driving unit 23b that drives the iris 23 so to be opened or shut.

A lens-block-controlling unit 51 receives a detection signal RSf indicating a position of a focal point of focus lens 21 from the lens-position-detecting unit 21a, a detection signal RSw indicating an amount of wobbling from the lens-position-detecting unit 22a, a detection signal RSi indicating an opening level of an aperture of the iris 23 from the iris-position-detecting unit 23a, respectively. The lens-block-controlling unit 51 is connected to a user interface 55 for setting an autofocus operation mode and starting an autofocus operation. According to user's manipulations of the user interface 55, the lens-block-controlling unit 51 can receive any manipulation signals PSL. The lens-block-controlling unit 51 can also have a storage unit, which is not shown, that is constituted of a read-only memory (ROM), an electrically erasable programmable read-only memory (EEPROM) or the like. The storage unit may store data on focal length of each of the focus lens 21 and the wobbling lens 22 and data on aperture ratio as well as any information on a manufacturer's name and serial number of the lens block, and the like.

The lens-block-controlling unit 51 generates lens-driving signals RDf, RDw based on the stored information, the detection signals RSf, RSw, and RSi, and the manipulation signals PSL as well as a focus-controlling signal CTf and a wobbling-controlling signal CTw that are received from a camera-block-controlling unit 52, which will be described later. The lens-block-controlling unit 51 further supplies the generated lens-diving signal RDf to the lens-driving unit 21b to drive the focus lens 21, thereby allowing a desired subject to be in focus. The lens-block-controlling unit 51 additionally supplies the generated lens-diving signal RDw to the lens-driving unit 22b to drive the wobbling lens 22, thereby allowing a direction of an in-focus position of the focus lens 21 to be detected. The lens-block-controlling unit 51 also generates an iris-controlling signal RDi and supplies it to the iris-driving unit 23b, thereby allowing the opening level of aperture of the iris 23 to be controlled.

A color separation prism 31 in a camera block 30 separates incident light from the lens block 20 into three primary colors of red (R), green (G), and blue (B) and supplies R component thereof to an image pickup device 32R, G component thereof to an image pickup device 32G, and B component thereof to an image pickup device 32B, respectively.

The image pickup device 32R generates an image signal SR corresponding to the R component by photoelectric conversion and supplies it to the preamplifier 33R. The image pickup device 32G generates an image signal SG corresponding to the G component by the photoelectric conversion and supplies it to the preamplifier 33G. The image pickup device 32B generates an image signal SB corresponding to the B component by the photoelectric conversion and supplies it to the preamplifier 33B.

The preamplifier 33R amplifies a level of the image signal SR, performs correlated dual sampling thereon to reduce any reset noise, and supplies the noise-reduced image signal SR to an A/D converter 34R. The A/D converter 34R receives the image signal SR, converts it into a digital image signal DRa, and supplies it to a preprocessing unit 35.

The preamplifier 33G amplifies a level of the image signal SG, performs correlated dual sampling thereon to reduce any reset noise, and supplies the noise-reduced image signal SG to an A/D converter 34G. The A/D converter 34G receives the image signal SG, converts it into a digital image signal DGa, and supplies it to the preprocessing unit 35.

The preamplifier 33B amplifies a level of the image signal SB, performs correlated dual sampling thereon to reduce any reset noise, and supplies the noise-reduced image signal SB to an A/D converter 34B. The A/D converter 34B receives the image signal SB, converts it into a digital image signal DBa, and supplies it to the preprocessing unit 35.

The preprocessing unit 35 receives the image signals DRa, DGa, and DBa to adjust their gains and to perform a stability of black level, an adjustment of dynamic range thereof and the like, generates image signals DRb, DGb, and DBb, and supplies the image signals DRb, DGb, and DBb thus generated to a signal-processing unit 36 and a focus evaluation value-calculating unit 37.

The signal-processing unit 36 receives the image signals DRb, DGb, and DBb to perform various kinds of signal processing on them, thereby generating image output signals DVout. For example, Knee compensation for compressing an image signal having a level over a set level, gamma correction for correcting a level of the image signal according to any various set gamma curves, and white and black clipping for limiting a level of the image signal to stay in a set region are performed. The signal-processing unit 36 also performs edge enhancement processing, linear matrix processing, encoding processing for generating the image output signal DVout having a desired format and the like.

The focus evaluation value-calculating unit 37 generates brightness signals DY based on the image signals DRb, DGb, and DBb received from the preamplifier 35 and calculates any focus evaluation values ID using the brightness signals DY. The focus evaluation value-calculating unit 37 then supplies the focus evaluation values ID to the camera-block-controlling unit 52.

FIG. 3 shows a configuration of the focus evaluation value-calculating unit 37. The focus evaluation value-calculating unit 37 has a brightness-signal-generating circuit 371 for generating the brightness signal DY based on the image signals DRb, DGb, and DBb, focus evaluation value-generating circuits 372-ID0 through 372-ID13 for generating fourteen kinds of focus evaluation values ID0 through ID13, which will be described later, and an interface circuit 373 for communicating with the camera-block-controlling unit 52 and supplying the generated focus evaluation values ID0 through ID13 to the camera-block-controlling unit 52 according to any request from the camera-block-controlling unit 52.

By using the image signals DRb, DGb, and DBb received from the preprocessing circuit 35, the brightness-signal-generating circuit 371 generates the brightness signal DY by calculation as follows:

$$DY=0.30DRb+0.59DGb+0.11DBb.$$

This is because it is adequate to determine whether a contrast is high or low in order to determine whether the focus is achieved and adequate to detect an alteration in level of the brightness signal DY as an alteration in the contrast.

The focus evaluation value-generating circuit 372-ID0 generates the following focus evaluation values ID0. Similarly, each of the focus evaluation value-generating circuits 372-ID1 through 372-ID13 generates the following focus evaluation values ID1 through ID13.

Focus evaluation value ID0: a name of focus evaluation value, "IIR1_W1_HPeak";

Focus evaluation value ID1: a name of focus evaluation value, "IIR1_W2_HPeak";

Focus evaluation value ID2: a name of focus evaluation value, "IIR1_W2_HPeak";

Focus evaluation value ID3: a name of focus evaluation value, "IIR4_W3_HPeak";

Focus evaluation value ID4: a name of focus evaluation value, "IIR0_W1_VIntg";

Focus evaluation value ID5: a name of focus evaluation value, "IIR3_W1_VIntg";

Focus evaluation value ID6: a name of focus evaluation value, "IIR1_W1_HIntg";

Focus evaluation value ID7: a name of focus evaluation value, "Y_W1_HIntg";

Focus evaluation value ID8: a name of focus evaluation value, "Y_W1_Satul";

Focus evaluation value ID9: a name of focus evaluation value, "IIR1_W3_HPeak";

Focus evaluation value ID10: a name of focus evaluation value, "IIR1_W4_HPeak";

Focus evaluation value ID11: a name of focus evaluation value, "IIR1_W5_HPeak";

Focus evaluation value ID12: a name of focus evaluation value, "Y_W3_HIntg; and

Focus evaluation value ID13: a name of focus evaluation value, "Y_W3_HIntg.

Herein, to the above focus evaluation values ID0 trough ID13, respectively, are applied the names of focus evaluation values indicating attributes thereof, "use data_a size of evaluation window_a calculation method of focus evaluation value". The evaluation window is a particular region that is provided in an image frame.

These focus evaluation values ID0 through ID13 are basically obtained by adding frequency components of an image signal together in the evaluation window and indicate values corresponding to any blurs in an image.

There are "IIR" and "Y" in the "use data" of the names of focus evaluation values. The "IIR" uses data on high frequency component that is filtered out of the brightness signal DY by using a high-pass filter (HPF). The "Y" uses frequency component of the brightness signal DY as it is without using any HPF.

When using HPF, an infinite impulse response (IIR) typed HPF may be used. Based on species of HPF, IIR is classified into IIR0, IIR1, IIR3, and IIR4, which represent HPFs having different cut-off frequencies. Setting HPF so as to have different cut-off frequencies allows an alteration in the focus evaluation values to be enlarged, for example, at a near position of in-focus position if an HPF having a high cut-off frequency is used, in contrast with a case where an HPF having a low cut-off frequency is used. If it is hardly focused, an alteration in the focus evaluation values can be enlarged when an HPF having a low cut-off frequency is used, in contrast with a case where an HPF having a high cut-off frequency is used. Thus, HPF can be set so as to have different cut-off frequencies, in order to select a most suitable focus evaluation value according to any focus situation during auto-focus operations.

The size of evaluation window is a size of image region to be used for generating the focus evaluation value. In this embodiment, the sizes of the evaluation window illustrate the following five species of the sizes of the evaluation windows W1 through W5.

Size of evaluation window W1: 116 pixels by 60 pixels;
Size of evaluation window W2: 96 pixels by 60 pixels;
Size of evaluation window W3: 232 pixels by 120 pixels;
Size of evaluation window W4: 192 pixels by 120 pixels; and
Size of evaluation window W5: 576 pixels by 180 pixels.

A center of each of these evaluation windows aligns a center of imaging frame. It is to be noted that, in FIG. 4, the sizes of the evaluation windows W1 through W5 are illustrated in a case where a frame size of one field is 768 pixels by 240 pixels.

Thus, setting the evaluation windows so as to have a various kinds of sizes thereof allows to be produced any focus evaluation values that are suitable to any sizes of the evaluation windows. This allows any suitable focus evaluation values to be selected among the focus evaluation values ID0 through ID13 to meet whatever size target subject has.

As the calculation method of focus evaluation value, HPeak scheme, HIntg scheme, VIntg scheme, and Satul scheme may be illustrated. The HPeak scheme is a calculation method of horizontal direction focus evaluation values relative to any peaks. The HIntg scheme is a calculation method of horizontal direction focus evaluation values relative to any horizontal and vertical integration. The VIntg scheme is a calculation method of vertical direction focus evaluation values relative to any integration. The Satul scheme is a calculation method of calculating a number of pixels saturated in brightness thereof.

The HPeak scheme is also a calculation method of focus evaluation values for obtaining any high frequency component from a horizontal direction image signal using HPF. In this embodiment, it is used for calculating the focus evaluation values ID0, ID1, ID2, ID3, ID9, ID10, and ID11.

Figure 5:
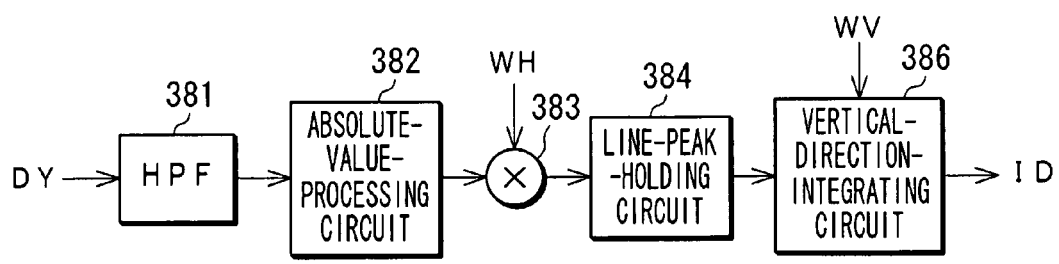
FIG. 5 is a block diagram for showing a configuration of a calculation filter for filtering a horizontal direction focus evaluation value.

FIG. 5 shows a configuration of a calculation filter for filtering a horizontal direction focus evaluation value to be used for the HPeak scheme, which may be used in the focus evaluation value-calculating unit 37. This calculation filter for filtering a horizontal direction focus evaluation value has an HPF 381 for filtering only high frequency components out of brightness signal DY from a brightness-signal-generating circuit, an absolute-processing circuit 382 for computing an absolute of these high frequency components, a multiplication circuit 383 for multiplying the absolute of these high frequency components by a horizontal direction window control signal WH, a line-peak-holding circuit 384 for holding a peak value per one line, and a vertical-direction-integrating circuit 386 for vertically integrating peak values of all the lines within the evaluation window.

The HPF 381 filters high frequency components out of the brightness signal DY and the absolute-processing circuit 382 computes an absolute of these high frequency components.

The multiplication circuit 383 multiplies the absolute by the horizontal direction window control signal WH to obtain an absolute value of the high frequency components within the evaluation window. In other words, if supplying to the multiplication circuit 383 a window control signal WH of which a multiplied value becomes zero out of the evaluation window, it is possible to supply to the line-peak-holding circuit 384 only a horizontal direction absolute of the high frequency components within the evaluation window. Further, if setting a window control signal WH so that the multiplied value can become smaller at a position near a window in the evaluation window, it is possible to eliminate any noise in the focus evaluation values based on an influence on an invasion of any extra-edges (any edges having high brightness) that exist near the window of the evaluation window into the evaluation window, which occurs responding to an advance of focusing, and an abrupt alteration in the focus evaluation values accompanied with any rolling and/or pitching of a subject.

The line-peak-holding circuit 384 may hold a peak value for every line. The vertical-direction-integrating circuit 386 vertically adds or integrates peak values, which have been held, of each line within the evaluation window based on a vertical direction window control signal WV to generate any focus evaluation values ID. It is to be noted that this scheme is so called as "HPeak" because a horizontal direction peak is once held.

Figure 6:
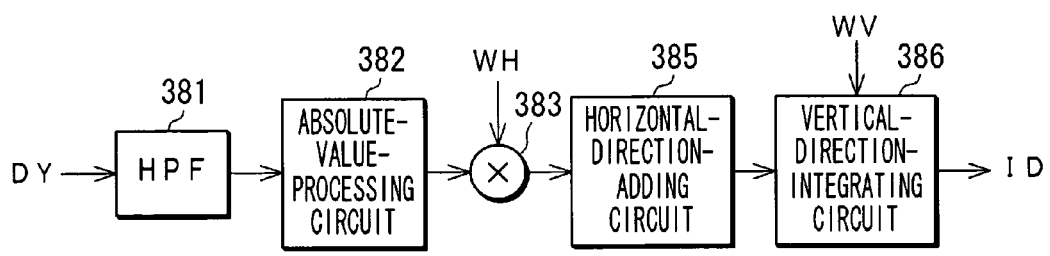
FIG. 6 is a block diagram for showing a configuration of a calculation filter of a horizontal and vertical direction integral scheme for filtering a horizontal direction focus evaluation value.

The HIntg scheme is a calculation method of focus evaluation values for obtaining horizontal direction focus evaluation values by using a vertical and horizontal integration. FIG. 6 shows a configuration of a calculation filter for filtering a horizontal direction focus evaluation value according to the vertical and horizontal integration, which may be used in the focus evaluation value-calculating unit 37. This calculation filter has a configuration similar to the above calculation filter of HPeak scheme as shown in FIG. 5 except for using a horizontal-direction-adding circuit 385 in stead of the line-peak-holding circuit. In this calculation filter shown in FIG. 6, the horizontal-direction-adding circuit 385 horizontally adds all the absolute values of the high frequency components within the evaluation window and the vertical-direction-integrating circuit 386 vertically integrates the added result of all the lines in the evaluation window.

Such the calculation filter for filtering a horizontal direction focus evaluation value according to the vertical and horizontal integration is used for calculating the focus evaluation values ID6, ID7, ID12, and ID13, in this embodiment.

As comparing the HIntg scheme with the HPeak scheme, they are different from each other in that in the HPeak scheme, a peak value is calculated for every line and the calculated peak values are vertically added while in the HIntg, all the absolute values of the high frequency components in each line within the evaluation window are horizontally added and the added ones are vertically integrated.

The Hintg scheme is classified into "IIR1" that a high frequency component is used in its use data and "Y" that uses therein the brightness signal DY itself as it is. It is to be noted that a brightness-adding-value-calculating filter circuit, which is a filter circuit that removes HPF 381 from the calculation filter shown in FIG. 6, can get a brightness-adding value.

The VIntg scheme is a calculation method of focus evaluation values for obtaining vertical direction focus evaluation values by using a vertical integration. In this embodiment, it is used for calculating the focus evaluation values ID4, and ID5. Both of the HPeak and HIntg schemes perform a horizontal addition to produce the focus evaluation values while the VIntg scheme adds high frequency components vertically to produce the focus evaluation values. If only the vertical high frequency components exist but no horizontal high frequency component exist, for example, an image in which an upper half of scene is white and a lower half of the scene is black, an image of the horizon or the like, the calculation method of horizontal direction focus evaluation values according to the HPeak scheme does not effectively function. The focus evaluation values of the VIntg scheme are used for the autofocus to function effectively in such the scenes.

Figure 7:
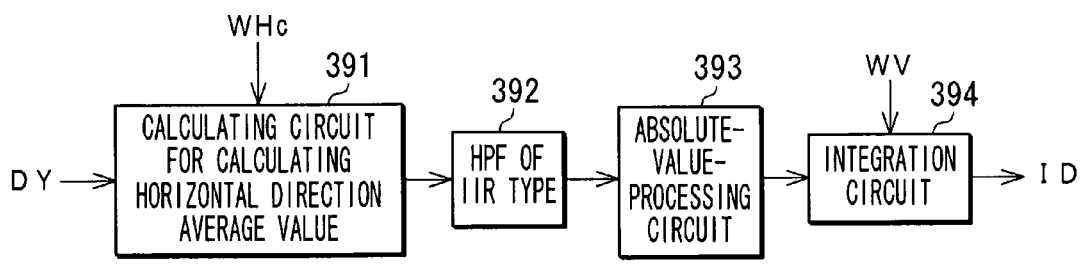
FIG. 7 is a block diagram for showing a configuration of a calculation filter for filtering a vertical direction focus evaluation value.

FIG. 7 shows a configuration of a calculation filter for filtering a vertical direction focus evaluation value, which may be used in the focus evaluation value-calculating unit 37. The calculation filter for filtering a vertical direction focus evaluation value has a calculating circuit 391 for calculating a horizontal direction average value, an HPF 392 of IIR type, an absolute-value-processing circuit 393, and an integration circuit 394.

The calculating circuit 391 selects from the brightness signal DY of each line a brightness signal of any pixels (for example, 63 pixels) positioned at a center portion of the evaluation window in a horizontal direction thereof based on a window control signal WHc and calculates an average value thereof to transmit it as one output per one horizontal period. It is because any noise existed at a periphery of the evaluation window is eliminated to select 64 pixels of the center portion thereof. In this embodiment, since data of 64 pixels is stored in sequence and one average value is finally output, a simple configuration without any necessary for storage device such as a line memory or a frame memory can be achieved. Next, HPF 392 of IIR type filters a high frequency component with it being synchronized with a line frequency. The absolute-value-processing circuit 393 then computes an absolute of the high frequency components. The integration circuit 394 vertically integrates all the lines within the evaluation window based on the vertical direction window control signal WV.

The Satul scheme is a calculation method for obtaining a number of saturated pixel in the brightness signal DY (particularly, a number of the pixel of which brightness level becomes over a predetermined level) in the evaluation window. In this embodiment, the Satul scheme is used for calculating the focus evaluation value ID8. In the calculation of the focus evaluation value ID8, the focus evaluation value ID8 is determined by calculating how many pixels exceeding a threshold value α stay in the evaluation window for each field with the brightness signal DY being compared to the threshold value α.

Referring back to FIG. 2, a reference-signal-producing unit 40 produces a vertical synchronizing signal VD, a horizontal synchronizing signal HD, and a reference clock signal CLK, based on which each unit in the video camera 10 operates. The reference-signal-producing unit 40 supplies these signals to an image-pickup-device-driving unit 42. The image-pickup-device-driving unit 42 generates a driving signal RIR based on the vertical synchronizing signal VD, the horizontal synchronizing signal HD, and the reference clock signal CLK thus supplied to supply it to the image pickup device 32R in order to drive it. Similarly, the image-pickup-device-driving unit 42 also generates driving signals RIG, RIB, respectively, to supply them to the image pickup devices 32G, 32B in order to drive them. It is to be noted that the preamplifiers 33R, 33G, and 33B, the A/D converters 34R, 34G, and 34B, the preprocessing unit 35, the signal-processing unit 36, the focus evaluation value-calculating unit 37 and the like performs various kinds of processing using the vertical synchronizing signal VD, the horizontal synchronizing signal HD, and the reference clock signal CLK that are synchronized with an image signal received from their respective previous units. These signals may be received from the reference-signal-producing unit 40 or from their respective previous units together with the image signal.

Responding a request from the camera-block-controlling unit 52, a distance measurement sensor 45 performs any measurement to supply to the camera-block-controlling unit 52 a measured distance result Mag indicating a distance to a subject. When failing to perform any measurement, the distance measurement sensor 45 transmits data (hereinafter referred to as "inability data NG") indicating inability to perform any measurement as the measured distance result Mag. The distance measurement sensor 45 illustrates a distance measurement sensor of active scheme that measures a distance to a subject by utilizing a reflection of infrared ray, electric wave, or the like when irradiating it. The distance measurement sensor 45 also illustrates a distance measurement sensor of a passive scheme that measures a distance to a subject by utilizing a shift, sharpness or the like of brightness signal obtained by detecting brightness information on the subject using a sensor.

The camera-block-controlling unit 52 is connected to the user interface 56. The camera-block-controlling unit 52 generates any control signals based on the manipulation signal PSC received from the user interface 56 and supplies the control signals to respective units to control them so that the video camera 10 can operate based on the manipulation signal PSC or the like.

The lens-block-controlling unit 51 and the camera-block-controlling unit 52 can be communicated to each other using a previously set format and/or a previously set protocol. The lens-block-controlling unit 51 and the camera-block-controlling unit 52 perform any control on autofocus operations.

The lens-block-controlling unit 51 also supplies to the camera-block-controlling unit 52 various kinds of information QF (for example, information on a position of a focal point of the lens, an iris value and the like) responding a request from the camera-block-controlling unit 52.

The lens-block-controlling unit 51 further generates lens-driving signals RDf, RDw based on the focus control signal CTf, the wobbling control signal CTw and the like that are received from the camera-block-controlling unit 52 and controls the lens-driving units 21*b*, 22*b* to drive the focus lens 21 and wobbling lens 22.

The camera-block-controlling unit 52 generates the focus control signal CTf for performing a drive control of the focus lens 21 and the wobbling control signal CTw for performing a drive control of the wobbling lens 22, based on the focus evaluation values ID calculated in the focus evaluation value-calculating unit 37, the measured distance result mag obtained by the distance measurement sensor 45, and various kinds of information read out of the lens-block-controlling unit 51. The camera-block-controlling unit 52 supplies them to the lens-block-controlling unit 51.

The lens-block-controlling unit 51 and the camera-block-controlling unit 52 can be built-in together. In the following description, a controller 50 will indicate a combination of the lens-block-controlling unit 51 and the camera-block-controlling unit 52. The controller 50 may be constituted of microcomputer, a memory and the like and execute autofocus operations by running various programs read out of the memory.

Figure 8:
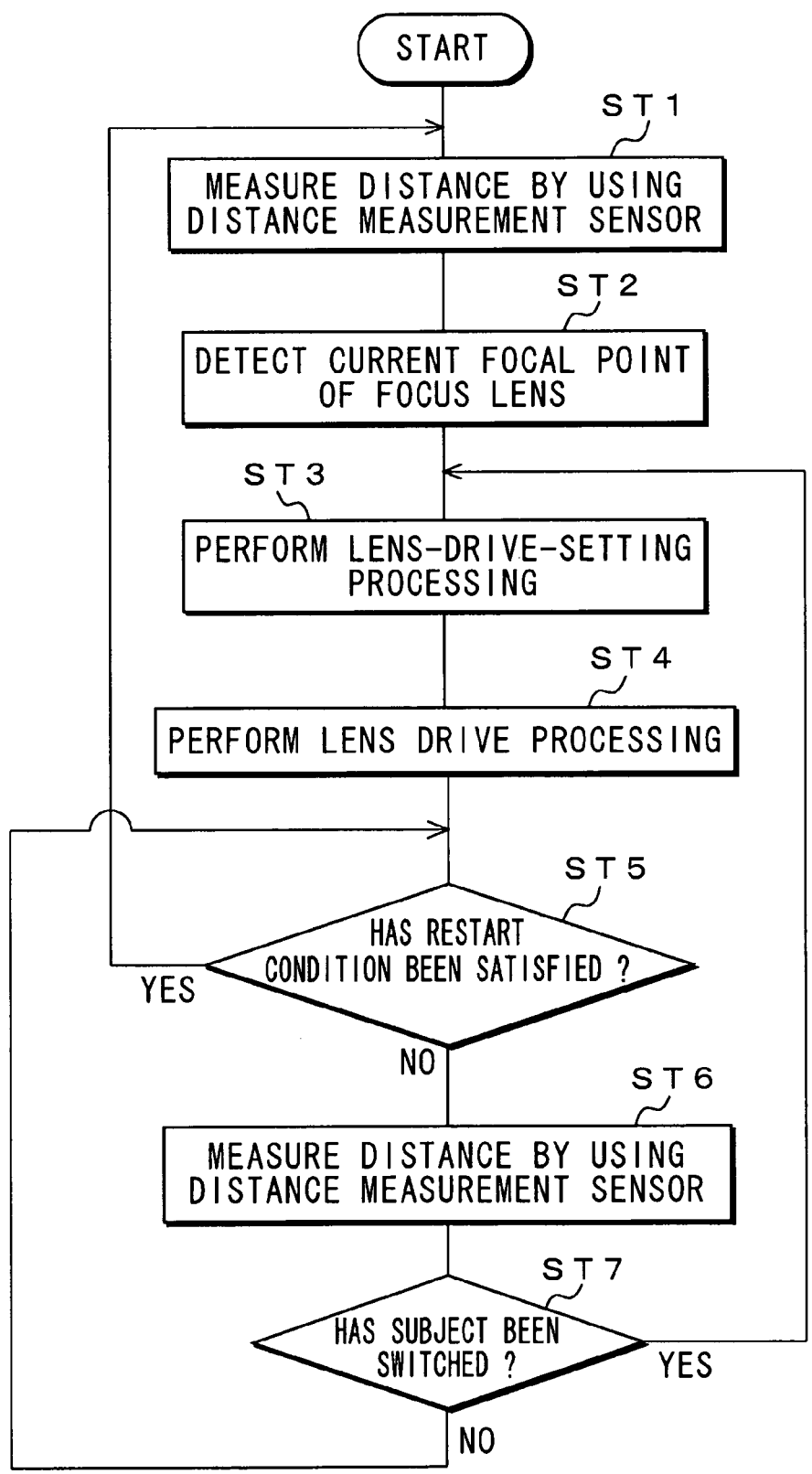
FIG. 8 is a flowchart for showing an autofocus operation of the video camera.

The following will describe autofocus operations of the video camera 10. FIG. 8 shows a flowchart of an autofocus operation.

At a step ST1, the controller 50 controls the distance measurement sensor 45 to measure the distance to a subject and to transmit the measured distance result Mag therefrom.

At a step ST2, the controller 50 detects a current position of a focal point FPs of the focus lens 21 based on the detection signal RSf received from the lens-position-detecting unit 21a.

At a step ST3, the controller 50 performs any lens-drive-setting processing. In such the lens-drive-setting processing, a driving direction and a driving speed of the focus lens 21 is set based on the current position of a focal point FPs and the measured distance result Mag.

Figure 9:
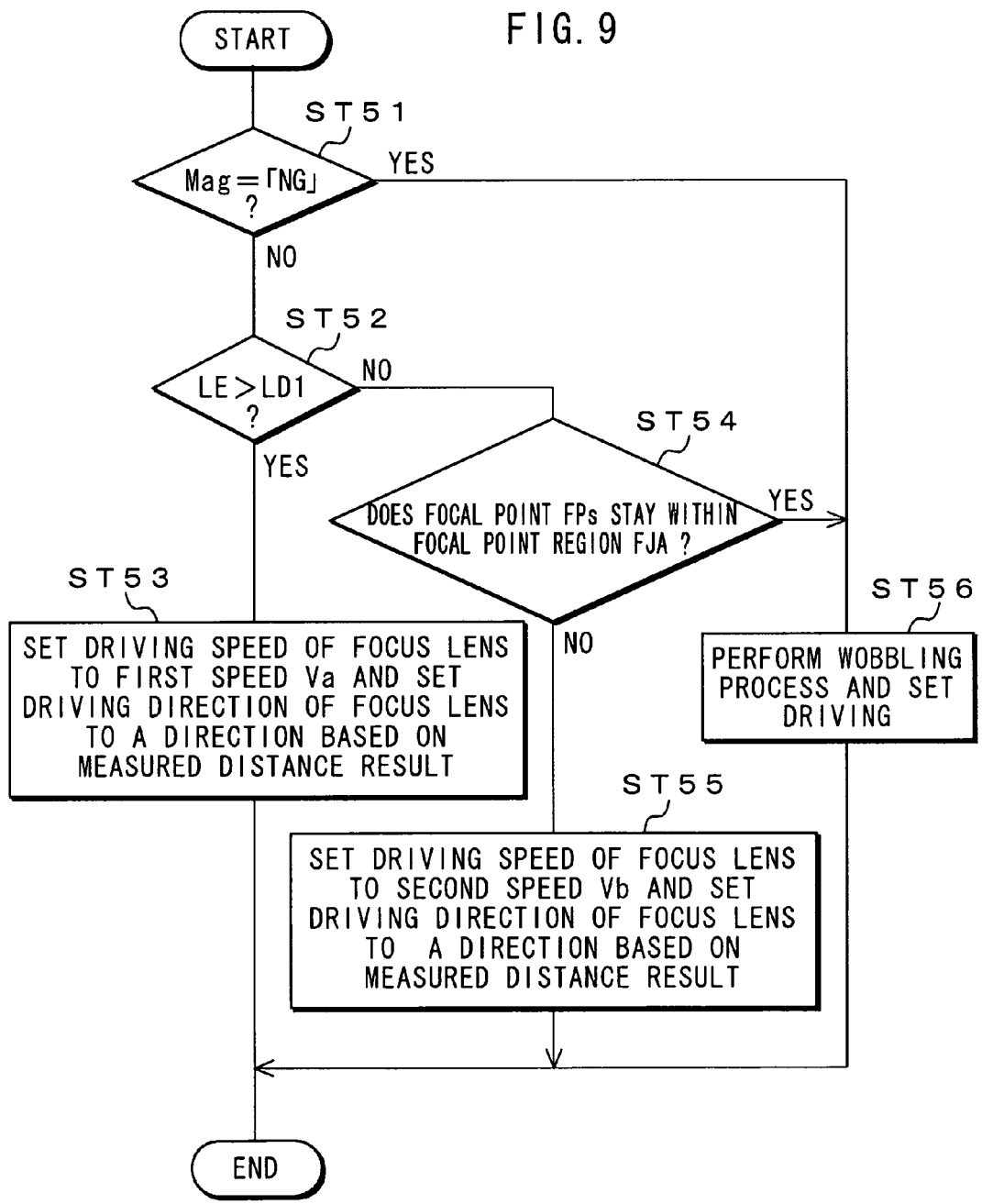
FIG. 9 is a flowchart for showing lens-drive-setting processing.

FIG. 9 shows a flowchart of the lens-drive-setting processing.

At a step ST51, the controller 50 determines whether the measured distance result Mag is inability data NG. If no inability data NG, the processing goes to a step ST52 while if inability data NG, the processing goes to a step ST 56.

At the step ST52, the controller 50 determines whether the current position of the focal point FPs stays away from the in-focus region FJA based on the measured distance result Mag with it staying further away from a first determined distance LD1. If a distance LE from the current position of the focal point FPs to the in-focus region FJA based on the measured distance result Mag is longer than the first determined distance LD1, the processing goes to a step ST53 while if not, the processing goes to a step ST54.

The in-focus region FJA is set relative to the measured distance result Mag so that a in-focus position FPj on a subject, which corresponds to the measured distance result mag, can be included therein. For example, an erroneous region of distance measurement based on the measured distance result Mag is set to the in-focus region FJA. Alternatively, a region that is wider than the erroneous region of distance measurement based on the measured distance result mag may be set to the in-focus region FJA. An amount of the first determined distance LD1 can be set taking into consideration a control facility of the focus lens 21. Namely, if the focus lens 21 is tried to be driven at a first driving speed Va, which will be described later, when the first determined distance LD1 is too short, the focus lens would have already reached the in-focus position FPj before it reaches to the first driving speed Va. If the focus lens 21 is driven at a very high speed, it may take much time to stop the focus lens 21, so that if the focus lens 21 is tried to stop when the focus lens 21 reaches near the in-focus position FPj, the focus lens 21 may pass through the in-focus position FPj, thereby resulting in poor focus operation. Therefore, the first determined distance LD1 can be set based on a maximum speed and control facility when the focus lens 21 is driven. Since such the maximum speed and control facility are different based on focus length and an iris value, the first determined distance LD1 can be adjusted based on the focus length and the iris value.

At the step ST53, the controller 50 sets a driving speed of the focus lens 21 to the first driving speed Va to let the focal point FPs of the focus lens 21 rapidly arrive the in-focus position FPj because the current position of the focal point FPs of the focus lens 21 stays away from the in-focus region FJA with the position of the focal point staying further away from the first determined distance LD1. The controller 50 also sets a driving direction of the focus lens 21 to a direction based on the measured distance result Mag. In other wards, the driving direction is set so that the focal point FPs of the focus lens 21 can be driven toward a direction of a position of a focal point FPm indicated by the measured distance result Mag. Since it is possible to correctly determine a driving direction of the focus lens 21 based on the measured distance result Mag by the distance measurement sensor 45, any wobbling is not necessary for determining its driving direction thereof.

The first driving speed Va of the focus lens 21 is used for allowing the focal point of the focus lens 21 to be rapidly approached to the in-focus position. It is not necessary to limit its driving speed to prevent the focal point thereof from passing through the peak in the curve of the focus evaluation values because every focus evaluation value is revised only one time per one field. Thus, the first driving speed Va may be maximum one of allowable driving speeds when the focus lens 21 is driven.

The processing then goes from step ST52 to the step ST54 where the controller 50 determines whether a current position of the focal point FPs of the focus lens 21 stays within the in-focus region FJA. If no position of the focal point FPs stays within the in-focus region FJA, the processing goes to a step ST55 while if the position of the focal point FPs stays within the in-focus region FJA, the processing goes to a step ST56.

At the step ST55, the controller 50 sets a driving speed of the focus lens 21 to a second driving speed Vb that is slower than the first driving speed Va. The controller 50 also sets a driving direction thereof to a direction based on the measured distance result Mag. In other words, the driving direction thereof is set so that the focal point FPs of the focus lens 21 can be driven toward a direction of a position of a focal point FPm indicated by the measured distance result Mag. This second driving speed Vb is set to allow a speed change from the second driving speed Vb to a third driving speed Vc that is slower than the second driving speed vb to be smoothly achieved in order to prevent a curve of the focus evaluation values indicating an alteration in the focus evaluation values when the focus lens 21 is driven from being dwarfed.

For example, it is estimated that a depth-of-field is Fs, the second driving speed Vb is set to 12 Fs/field. It is to be noted that the third driving speed Vc is set to a speed that is capable of detecting a peak of the curve of the focus evaluation values accurately, for example, 2 Fs/field. If the maximum one of allowable speeds when the focus lens 21 is driven is not more than 12 Fs/field, the first driving speed Va is equal to the second driving speed Vb.

When the processing goes to the step ST56 from the step ST51 or ST54, the controller 50 performs wobbling similar to the past cases, and sets a driving direction of the focus lens 21 based on an alteration in the focus evaluation values when the wobbling lens 22 is driven. In this case, the controller 50 sets a driving speed of the focus lens 21 to the second driving speed Vb thereof. If a distance between the current position of the focal point FPs and a position of the focal point FPm is short, the controller 50 can set a driving speed of the focus lens 21 to the third driving speed Vc thereof because the current position of the focal point FPs stays near the in-focus position FPj.

Thereafter, at the step ST4 shown in FIG. 8, the controller 50 performs the lens drive processing. In the lens drive processing, a switch of driving speeds of the focus lens 21 and hill-climbing control processing similar to the past cases are performed, so that the focus lens 21 is driven to meet a position of the focal point FPs thereof to the in-focus position FPj.

If a distance from a position of the focal point FPs to the in-focus region FJA is shorter than a second determined distance LD2 that is shorter than the first determined distance LD1, the driving speeds of the focus lens 21 is switched from the first driving speed Va to the second driving speed Vb. The second determined distance LD2 is set so that the driving speed of the focus lens 21 can be decreased to the second driving speed Vb within the in-focus region FJA when the driving speed of the focus lens 21 is switched from the first driving speed Va to the second driving speed Vb, which will be described later, at a position, for example, away from the in-focus region FJA by the second determined distance LD2. Such the setting may prevent a focal point of the focus lens 21 from passing through a peak of the curve of the focus evaluation values in the in-focus region FJA because of less numbers of the focus evaluation values.

In the hill-climbing control processing, any increase and decrease in the focus evaluation values calculated by the focus evaluation value-calculating unit 37 are detected and the focal point FPs of the focus lens 21 is driven so that this detected focus evaluation value can be maximum value, thereby meeting a position of the focal point FPs to the in-focus position FPj. In the hill-climbing control processing using the focus evaluation values in this embodiment, the focus lens 21 is driven so that the above focus evaluation value ID0, ID2 or the like can be maximum value. If pixels having larger brightness increase, an evaluation window size W1 is switched to an evaluation window size W5 and the focus evaluation value is calculated by using the focus evaluation value ID8, in order to prevent the focus lens 21 from being driven to a direction where blur occurs. Further, by using the focus evaluation value ID0 and other focus evaluation values ID1 through ID7 and ID9 through ID13, a change of driving speeds of the focus lens 21 can be determined, any rolling and/or pitching of the subject can be determined, a reverse driving of the focus lens 21 can be determined, and a reach of focus lens 21 to its Near point or Far point can be determined. Based on these determination results, driving operations of the focus lens 21 is controlled to achieve an excellent accurate focusing. Thus, such the hill-climbing control processing is performed to meet the position of the focal point of the focus lens 21 to the in-focus position FPj. The autofocus operations finish.

FIG. 10 shows the autofocus operations using the measured distance result. When a current position of the focal point FPs of the focus lens 21 stays away from the in-focus region FJA based on the measured distance result Mag with the position of the focal point staying further away from the first determined distance LD1, namely, the distance LE from the current position of the focal point FPs to the in-focus region FJA based on the measured distance result Mag is longer than the first determined distance LD1, the focus lens 21 is driven at the first driving speed Va without any wobbling. The focus lens 21 is then driven at the second driving speed vb and the third driving speed Vc. When a period of time Tafu is elapsed, the position of focal point FPs meets the in-focus position FPj. This allows a period of focusing time to be much shortened as comparing it with the past autofocus operations, shown in FIG. 10 by broken lines, such that wobbling is performed to determine a direction where the focus lens is driven, the focus lens 21 is then driven at the second driving speed Vb, and when a period of time Tafv is elapsed, the position of focal point FPs meets the in-focus position FPj.

When a current position of the focal point FPa stays nearer the in-focus region FJA based on the measured distance result Mag than the first determined distance LD1 with the position of the focal point staying out of the in-focus region FJA, the focus lens 21 is driven at the second driving speed Vb without any wobbling. This allows a period of focusing time to be shortened as comparing it with the past autofocus operation such that the wobbling is performed at a start point of the autofocus operation.

Thereafter, at the step ST5 shown in FIG. 8, the controller 50 determines whether any restart condition to restart the autofocus operation has been satisfied. If the restart condition has been satisfied, the processing goes back to the step ST1 where the above processing will be repeated so that the focus lens 21 is driven to meet a position of the focal point of the lens 21 to an in-focus position thereof. If the restart condition has not yet been satisfied, the processing goes to step ST6.

The following will describe the restart condition. In this embodiment, there are two modes, a scene steady mode and a scene unsteady mode. If an alteration in brightness exceeds a predetermined threshold value, it is determined that the video camera 10 pans in a horizontal plane thereof or a subject moves on a large scale to switch the mode to the scene unsteady mode. If an alteration in brightness becomes smaller to satisfy any shift condition for switching the mode from the scene unsteady mode to the scene steady mode, the scene unsteady mode is switched to the scene steady mode. In this scene steady mode where an alteration in brightness is small, it is determined that the video camera 10 does not pan or pans slowly, if any, or a subject does not move. In this embodiment, it is set so that the restart is stopped in the scene unsteady mode and the restart can be performed when the scene unsteady mode is switched to the scene steady mode.

Thus, the restart using such the alteration in brightness avoids any erroneous determination on the restart because a field of view is not changed if a position of the focal point of the lens comes closer to the in-focus position thereof during the autofocus operation to make little brightness integration value thereof changed.

Herein, as the brightness integration value, a normalized difference p0 of the brightness integration is illustratively used. The normalized difference p0 can be calculated according to the following equation:

$$p0=(Yadd\_W5\_f0-Yadd\_W5\_f1)/Tnow\_W5f0/N1 \quad (1)$$

where a term, "Yadd_W5_f0" indicates a sum total of brightness integration values of an image signal relative to an evaluation window W5 within a period of time from a previous field of N1 to a current field; a term, "Yadd_W5_f1" indicates a sum total of brightness integration values of an image signal relative to an evaluation window W5 within a period of time from a field of N1+1 to a previous field of 2*N1; and a term, "Ynow_W5_f0" indicates a brightness integration value of an image signal relative to an evaluation window W5 in a current field.

When an absolute value ABS (p0) of the normalized difference p0 exceeds a predetermined threshold value β1 in the scene steady mode, the mode is switched from the scene steady mode to the scene unsteady mode. When the absolute value ABS (p0) falls below a predetermined threshold value β2 in the scene unsteady mode, the mode is switched from the scene unsteady mode to the scene steady mode to restart the autofocus operation and meet a position of the focal point of the lens to an in-focus position thereof to complete the autofocus operation.

Alternatively, as the restart condition, an alteration in focus evaluation values can be used. In this embodiment, if average value of the focus evaluation values ID0 in a time direction thereof increases from the focus evaluation value of the autofocus operation completion (just after meeting a position of the focal point of the focus lens to the in-focus position thereof) by a set rate thereof during the scene steady mode, the restart can be performed.

If the video camera 10 is set firmly and a scene change is small, for example, a scene where a subject comes toward the video camera 10 thus set, little brightness integration value is changed so that the restart fails to be performed if only normalized difference of the brightness integration is taken into consideration. If, however, an average of the focus evaluation values in a time direction thereof is taken into consideration, it is also possible to restart the autofocus operation.

An alteration q0 in the focus evaluation values can be calculated according to the following equation:

$$q0 = Hadd\_W1\_f1 / Hadd\_W1\_f0 \quad (2)$$

where a term, "Hadd_W1_f0" indicates a sum total of the focus evaluation values calculated, for example, added by using frequency components of the image signal relative to an evaluation window W1 within a period of time from a time when a scene is stable to a field of M; and a term, "Hadd_W1_f1" indicates a sum total of the focus evaluation values within a period of time from a current field to a previous filed of M.

In this embodiment, if the alteration q0 in the focus evaluation values falls below $1/\gamma$ or exceeds $\gamma$, the autofocus operation restarts ($\gamma$ and M are respectively constants).

Thus, using an alteration in the average of the focus evaluation values in a time direction thereof enables the restart without any influence on any rolling and/or pitching of subject and/or any vibrations of the camera.

When using any normalized difference, it is not easy to restart the autofocus operation because little alteration in the normalized difference shows if the camera pans very slowly. Thus, in this embodiment, if the brightness integration value increases from the focus evaluation value of the autofocus operation completion (just after meeting a position of the focal point of the focus lens to the in-focus position thereof) by a set rate thereof, the restart can be performed.

An alteration r0 in the brightness integration values can be calculated according to the following equation:

$$r0 = Y\_now / Y\_jp \quad (3)$$

where a term, "Y_now" indicates a current brightness integration value; and a term, "Y_jp" indicates a brightness integration value just after the autofocus operation is completed.

In this embodiment, if the alteration r0 in the brightness integration values falls below $1/\delta$ or exceeds $\delta$, the autofocus operation restarts ($\delta$ is constants). Thus, using the alteration in the brightness integration values enables the autofocus operation restarting even if the camera pans very slowly.

Thereafter, the processing goes from the step ST5 shown in FIG. 8 to step ST6 where the control unit 50 controls the distance measurement sensor 45 to measure a distance to a subject and to transmit a measured distance result Mag therefrom, similar to the step ST1.

At step ST7, the control unit 50 determines whether the subject to be in focus has been switched. If the subject to be in focus has been switched, the processing goes back to the step ST3 where the lens-drive-setting processing and the lens-drive processing are performed, thereby allowing an autofocus process operation again so that the switched subject can be in focus. If the subject to be in focus has not yet been switched, the processing goes back to the step ST5.

The subjects to be in focus are switched by determining whether a subject existing in a position having a distance different from a position of the focal point FPs of the lens where the subject is in focus when the lens-drive processing is completed at the step ST4 can be imaged. For example, it is determined that the subject to be in focus has been switched if a determination period of time when a difference between a current position of the focal point FPs of the lens and the position of the focal point FPm of the lens based on the measured distance result Mag exceeds a predetermined threshold value lasts longer than a reference period of time for the switch of focusing on subjects. It is also determined that the subject to be in focus has not yet been switched if a difference between a current position of the focal point FPs of the lens and the position of the focal point FPm of the lens based on the measured distance result mag falls below a predetermined threshold value or if a determination period of time when the difference exceeds a predetermined threshold value lasts shorter than the reference period of time for the switch of focusing on subjects. The reference period of time for the switch of focusing on subjects is set so that the autofocus operation does not restart if another subject than the desired subject includes within a field of view for distance measurement by the distance measurement sensor 45 briefly. For example, if the reference period of time is set to 2 or 3 seconds, even when any person passes before the video camera 10, it is possible to prevent the autofocus operation where the passing person is in focus from restarting.

Figure 11A:
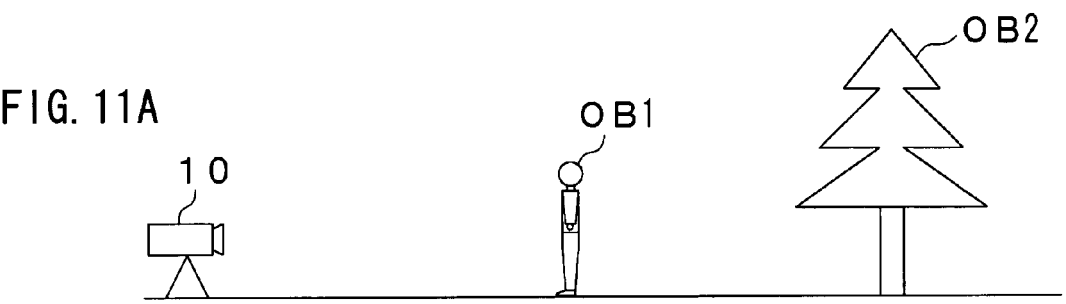
FIGS. 11A through 11C are drawings for illustrating back-focus-solving operations.
Figure 11B:
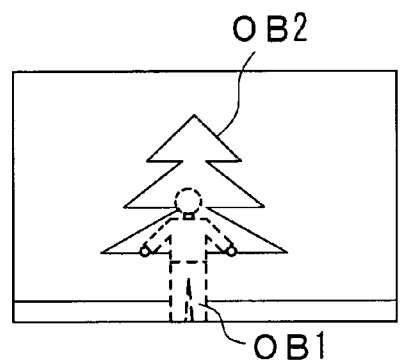
Figure 11C:
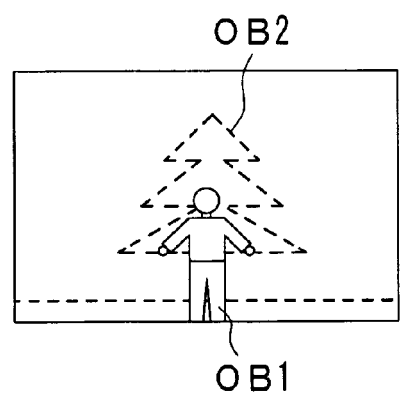

Thus, when it has been determined that the subject to be in focus has been switched by setting the reference period of time for the switch of focusing on subjects and the threshold value, any issue of the back focus can be solved if the autofocus operation is again performed by using a measured distance result Mag. For example, as shown in FIG. 11A, if an imaging apparatus 10 images a subject person OB1 and a background tree OB2 simultaneously, a blur image of the subject person OB1 occurs, as shown in FIG. 11B, when the tree OB2 is in focus. In this situation, a field of view for distance measurement by the distance measurement sensor 45 is set to the subject person OB1 that exists before the background tree OB2. In this time, if a determination period of time when a difference between the current position of the focal point FPs of the lens and the position of the focal point FPm of the lens based on the measured distance result Mag exceeds a predetermined distance for determination of the switching lasts longer than a reference period of time for the switch of focusing on subjects, the current position of the focal point FPs of the lens is shifted into an in-focus region FJA based on the measured distance result Mag, thereby enabling the hill-climbing processing to be carried out. This allows a blur image of the background tree OB2 to occur, as shown in FIG. 11C, when the subject person OB1 is in focus. Thus, in this embodiment, the issue of the back focus can be solved.

A period of time required for distance measurement in the distance measurement sensor 45 may alter based on brightness on an image to be imaged or the like. Measuring time of the distance measurement sensor may alter according to a difference in any distance measurement scheme or any characteristics of distance measurement. Thus, the reference period of time for the switch of focusing on subjects may extends or shortens based on brightness of an image to be imaged and/or measuring time of the distance measurement sensor. For example, if the distance measurement sensor 45 generates a signal based on a difference in contrast of the subject and performs any distance measurements using the signal, a level in the signal may be small because, when a dark subject is imaged, there is a little difference in contrast of the subject. Thus, in order to lift the level of signal up, any distance measurements can be performed by extending the measuring time. If, however, extending the measuring time, measured distance results to be obtained within the reference period of time for the switch of focusing on subjects decrease so that it may fail to correctly determine that the subject to be in focus has been switched. Thus, if extending the measuring time, the reference period of time for the switch of focusing on subjects also extends and many measured distance results are utilized so that it may correctly determine that the subject to be in focus has been switched, thereby solving the issue of back focus.

Alternatively, when a bright subject is imaged, measuring time is short. Thus, in this case, if the reference period of time for the switch of focusing on subjects shortens, it is possible to obtain a desired number of measured distance results within the reference period of time for the switch of focusing on subjects, thereby allowing a switch of focusing on subjects to be determined briefly. Thus, the reference period of time for the switch of focusing on subjects may extends or shortens based on brightness of an image to be imaged and/or measuring time of the distance measurement sensor, so that it is possible to increase accuracy of determination of the switch of focusing on subjects and realize a rapid switching therefor.

In this embodiment, an angular velocity sensor that generates a parameter indicating an alteration in a relative angle consisting of a line extending along a direction of the subject and a line extending along an imaging direction thereof, for example, a parameter indicating a rolling and/or pitching of a subject within the image happened by movements of a subject or vibration of the video camera 10 can be used. In this embodiment, the above brightness integration values and the focus evaluation values can be used as the parameter to detect an alteration in the relative angle and any one of the distance for determination of the switching, the reference period of time of the switch of focusing on subjects, and the determination operation can be changed based on the detected result thereof. This enables any erroneous operations to reduce. For example, if the reference period of time for the switch of focusing on subjects is set to extend or the distance for determination of the switching is set to extend when the alteration in the relative angle is large, it is possible to reduce any erroneous operations based on any vibrations of the video camera 10 or any movements of the subject. If the alteration in the relative angle is large, it is possible to reduce any erroneous operations based on any vibrations of the video camera 10 or any movements of the subject even when the determination whether the subject to be in focus has been changed is not performed.

In this embodiment, it is possible to determine a rolling and/or pitching of a subject using brightness integration values or focus evaluation values by utilizing any normalized differences of the focus evaluation values ID0 and ID7, similar to the past arts.

The normalized difference p0[0] % of the focus evaluation values ID0 is defined as p0[0]=50*|e0[0]−e2[0]|/e0[0] where e0[0] indicates a value of a current field and e2[0] indicates a value of previous field of two. Similarly, the normalized difference p0[7] % of the focus evaluation values ID7 is defined as p0[7]=50*|e0[7]−e2[7]|/e0[7] where e0[7] indicates a value of a current field and e2[7] indicates a value of previous field of two.

The normalized difference signifies a rate of an alteration in the focus evaluation values per one field. In this embodiment, a comparison is carried out in any one of odd field and even field by comparing a focus evaluation value of the current field with a focus evaluation value of previous field of two. This enables any influence by an alteration in the focus evaluation values based on a difference in odd field and even field to be eliminated. Similarity is applied to a case where, although a percentage is used in the above equations, multiplying by 50 times is performed therein.

Moving average values of three fields can be used as e0[0], e2[0], e0[7], and e2[7], respectively. In this case, when, for example, a fluorescent lamp in a room runs using commercial power having 50 Hz and the video camera 10 operates at 60 Hz to generate a flicker having 20 Hz by the fluorescent lamp, this influence may be eliminated.

Normalized differences are calculated using the focus evaluation values ID0 within a period of time of 12 fields for rolling and/or pitching determination in the subject to evaluate a maximum value of the respective normalized differences to a maximum normalized difference (hereinafter, referred to as "ndiff_e[0]"). The rolling and/or pitching determination can be performed using the maximum normalized difference ndiff_e[0].

If, however, a value of the focus evaluation value ID0 is small, the ndiff_e[0] appears larger even when no subject is rolled and/or pitched because of any stationary noise alteration, thereby resulting in the ndiff_e[0] exceeding a threshold value of the rolling and/or pitching determination.

Thus, if a value of the focus evaluation value ID0 is small, normalized differences are calculated using the focus evaluation values ID7 within a period of time of 12 fields to evaluate a maximum value of the respective normalized differences to a maximum normalized difference "ndiff_e[7]". The rolling and/or pitching determination is then performed using the maximum normalized difference ndiff_e[7].

Thus, in this embodiment, no maximum normalized difference ndiff_e[0] of the focus evaluation values ID0 is used for all cases. This is because it is conceivable that the ndiff_e[7] is more suitable for a case where the subject is rolled or pitched when the focus evaluation values ID0 falls below a threshold value.

To the rolling and/or pitching determination, the following standard is applied:

If an average of the focus evaluation values ID0 (within a period of time of 12 fields for rolling and/or pitching determination in the subject) exceeds 200 and ndiff_e[0]<3%, a stationary mode is set;

If an average of the focus evaluation values ID0 exceeds 200 and ndiff_e[0]≧3%, a rolling and/or pitching mode 1 is set, but if ndiff_e[0]≧30%, a rolling and/or pitching mode 2 that indicates a situation where rolling and/or pitching in the subject are larger than those in the rolling and/or pitching mode 1 is set;

If an average of the focus evaluation values ID0 falls below 200 and ndiff_e[7]<7%, a stationary mode is set; and If an average of the focus evaluation values ID0 falls below 200 and ndiff_e[7]≧7%, a rolling and/or pitching mode 1 is set, but if ndiff_e[7]≧12.5%, a rolling and/or pitching mode 2 is set.

If it is determined as the rolling and/or pitching mode 1 or 2, the determination whether the subject to be in focus has been switched is stopped. This enables any erroneous operations by vibrations of the video camera 10 and movements of the subject to be reduced.

Although autofocus operations may restart automatically in the above embodiments when it is determined that the subject to be in focus has been switched to solve the issue of back focus, this invention is not limited thereto. This invention is applicable to any other case where the issue of back focus is solved according to any user's instructions. FIG. 12 shows an autofocus operation used in such the case. It is to be noted that like reference numbers refer to like steps shown in FIG. 8, detailed explanations of which will be omitted.

At step ST7, the control unit 50 determines whether the subject to be in focus has been switched. If it is determined that the subject to be in focus has been switched, the processing goes to step ST8. If not, the processing goes back to the step ST5.

At the step ST8, the control unit 50 determines whether the issue of back focus has been solved. If a user manipulates a user interface 55 or 56 to instruct solving the issue of back focus, the processing goes back to the step ST3 and the above processing is repeated using the measured distance results Mag obtained at the step ST6, thereby enables the autofocus operation to restart so that the subject after switching can be in focus. If he or she does not instruct solving the issue of back focus, the processing goes back to the step ST5.

Thus, it is possible to focus on a subject within a field of view for distance measurement by the distance measurement sensor 45 after solving the issue of back focus only when the user wants to do so. If a user interface 55 or 56 is equipped with a changeover switch or a mode is able to be changed by means of software to select any one of the autofocus operations shown in FIGS. 8 and 12, it is possible to present a video camera that is easily usable.

Although an imaging device has been described as a video camera in the above embodiments, this invention is not limited thereto. This invention is applicable to any other imaging device such s digital still camera.

It should be understood by those who skill in the art that various modifications, combinations, sub-combinations and alterations may occur depending on design requirements and other factors insofar as they are within the scope of the appended claims or the equivalents thereof.

What is claimed is:

1. An autofocus device comprising:
   a lens-driving unit that drives a lens;
   a focal-point-position-detecting unit that detects a position of a focal point of the lens;
   a distance measurement sensor that measures a distance to an object; and
   a control unit that performs a focus operation to control the lens-driving unit to drive the lens so that the position of the focal point of the lens detected by the focal-point-detecting unit is set to an in-focus position,
   wherein, when a restart condition of the focus operation has not yet been satisfied after the position of the focal point of the lens is set to the in-focus position, the control unit determines a switch of focusing on objects based on the position of the focal point of the lens detected by the focal-point-detecting unit and a measured distance result by the distance measurement sensor, and
   wherein the control unit restarts the focus operation based on a determination result of the switch of focusing on objects and drives the lens so that the position of the focal point of the lens is set to an in-focus position based on a measured distance result by the distance measurement sensor,
   wherein the control unit determines whether a determination period of time for determination of the switch lasts longer than a reference period of time for the switch of focusing on objects and restarts the focus operation when the determination period of time lasts longer than the reference period of time, and
   wherein the control unit changes the reference period of time based on any one of brightness of an object to be imaged and measuring time of the distance measurement sensor.

2. The autofocus device according to claim 1, further comprising a user interface,
   wherein the control unit restarts the focus operation based on a result of the switching determination when receiving a signal instructing a restart from the user interface.

3. The autofocus device according to claim 1, further comprising a focus evaluation value-calculating unit that calculates focus evaluation values using a frequency component of an image signal in a first particular region provided in an image frame,
   wherein the control unit uses an alteration in the focus evaluation values as the restart condition.

4. The autofocus device according to claim 1, further comprising a brightness-integration-value-calculating unit that calculates integration values of brightness of an image signal in a second particular region provided in an image frame,
   wherein the control unit uses an alteration in the integration values as a restart condition.

5. An autofocus device comprising:
   a lens-driving unit that drives a lens;
   a focal-point-position-detecting unit that detects a position of a focal point of the lens;
   a distance measurement sensor that measures a distance to an object;
   a control unit that performs a focus operation to control the lens-driving unit to drive the lens so that the position of the focal point of the lens detected by the focal-point-detecting unit is set to an in-focus position; and
   a parameter-generating unit that generates a parameter indicating an alteration of a relative angle between a line extending along a direction of the object and a line extending along an imaging direction,
   wherein, based on the parameter, the control unit changes any one of a distance for determination of a switch, a reference period of time, and a determination operation of a switch of focusing on objects,
   wherein, when a restart condition of the focus operation has not yet been satisfied after the position of the focal point of the lens is set to the in-focus position, the control unit determines the switch of focusing on objects based on the position of the focal point of the lens detected by the focal-point-detecting unit and a measured distance result by the distance measurement sensor,
   wherein the control unit restarts the focus operation based on a determination result of the switch of focusing on objects and drives the lens so that the position of the focal point of the lens is set to an in-focus position based on a measured distance result by the distance measurement sensor, and
   wherein the control unit determines whether a determination period of time for determination of the switch lasts longer than a reference period of time for the switch of focusing on subjects and restarts the focus operation when the determination period of time lasts longer than the reference period of time.

6. An autofocus method comprising:

a focal-point-position detecting step of detecting a position of a focal point of a lens;

a distance-measuring step of measuring a distance to an object;

a switch determination step of determining a switch of focusing on objects based on the position of the focal point of the lens detected in the focal-point-detecting step and a measured distance result measured in the distance-measuring step if a restart condition of the focus operation has not yet been satisfied after setting the position of the focal point of the lens to the in-focus position; and a focus-readjusting step of restarting a focus operation based on a determination result of the switch of focusing on objects in the switch determination step to drive the position of the focal point of the lens to an in-focus position based on a measured distance result by a distance measurement sensor wherein the switch determination step includes determining whether a determination period of time for determination of the switch lasts longer than a reference period of time for the switch of focusing on objects and restarts the focus operation when the determination period of time lasts longer than the reference period of time, and wherein the reference period of time is changed based on any one of brightness of an object to be imaged and measuring time of the distance measurement sensor.

7. A computer-readable medium storing a computer executable program, which causes a device to perform an autofocus method, said method comprising:

a focal-point-position detecting step of detecting a position of a focal point of a lens;

a distance-measuring step of measuring a distance to a object;

a switch determination step of determining a switch of focusing on objects based on the position of the focal point of the lens detected in the focal-point-detecting step and a measured distance result measured in the distance-measuring step if a restart condition of the focus operation has not yet been satisfied after setting the position of the focal point of the lens to the in-focus position; and a focus-readjusting step of restarting a focus operation based on a determination result of the switch of focusing on objects in the switch determination step to drive the position of the focal point of the lens to an in-focus position based on a measured distance result by a distance measurement sensor wherein the switch determination step includes determining whether a determination period of time for determination of the switch lasts longer than a reference period of time for the switch of focusing on objects and restarts the focus operation when the determination period of time lasts longer than the reference period of time, and wherein the reference period of time is changed based on any one of brightness of an object to be imaged and measuring time of the distance measurement sensor.

* * * * *

UNITED STATES PATENT AND TRADEMARK OFFICE
CERTIFICATE OF CORRECTION

PATENT NO. : 7,593,053 B2
APPLICATION NO. : 11/400960
DATED : September 22, 2009
INVENTOR(S) : Ito et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 649 days.

Signed and Sealed this

Fourteenth Day of December, 2010

David J. Kappos
*Director of the United States Patent and Trademark Office*